May 16, 1933.  J. VAN VLIET  1,908,877
RAKE
Filed May 21, 1932
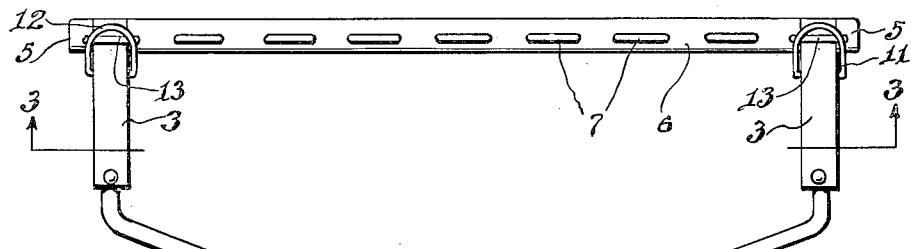
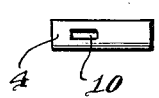
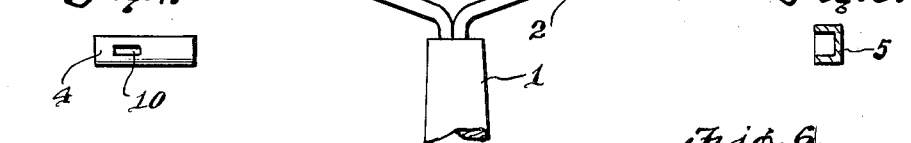
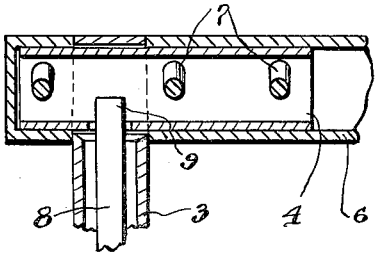
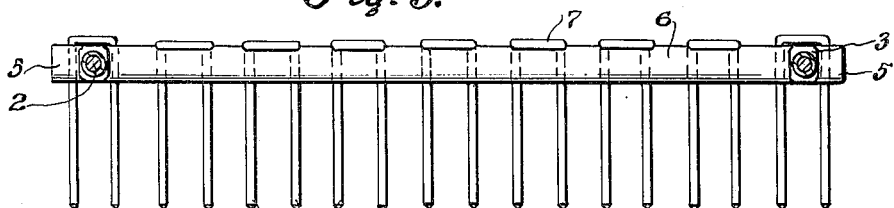
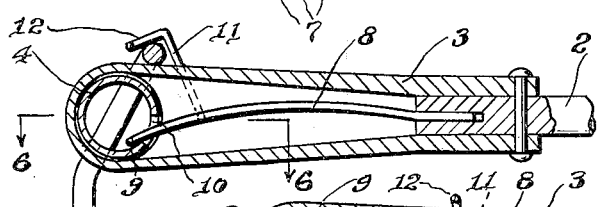
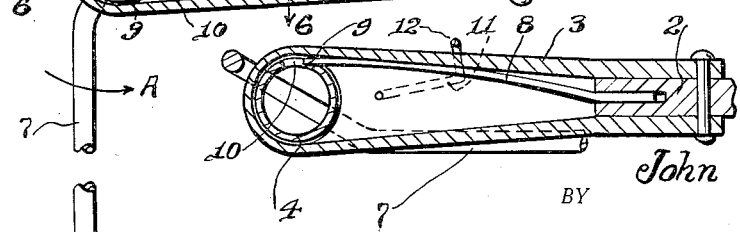
INVENTOR.
John Van Vliet
BY
J. Kaplan
ATTORNEY.

Patented May 16, 1933

1,908,877

UNITED STATES PATENT OFFICE

JOHN VAN VLIET, OF CHICAGO, ILLINOIS

RAKE

Application filed May 21, 1932. Serial No. 612,785.

This invention relates to improvements in hand rakes, the primary object of the invention being the provision of a hand rake which will be self cleaning.

A further object of the invention is to so construct the rake that waste matter may be freed and removed from the rake teeth while employing the rake in the usual manner, this construction being such as to avoid the necessity of employing individual spring fingers operating between the teeth to clean the same, sliding teeth cleaner members or other cleaning devices of similar nature which considerably increases the cost of rake manufacture and also the weight of the rake.

A still further object of the invention is to mount the rake head upon its handle in such manner that it will operate in the usual way when drawn towards the person employing the rake, while when pushed along the ground away from the operator, the rake head will tilt to bring its teeth parallel with the ground and thus permit wiping off or removal of all foreign matter therefrom.

A still further object of the invention is the provision of means for normally holding by resilient means the teeth perpendicular to the plane of the rake handle.

A still further object of the invention is the provision of a self cleaning rake in which the rake head may be swung to bring its teeth into a plane parallel with the rake handle to permit convenient packing or storing of the rake, and to prevent anyone from being injured by the free ends of the teeth, the head, when in this position, being locked against swinging movement.

Another object of the invention is to provide means for locking the tooth bar in position so that the teeth will be at right angles to the handle.

Another object of the invention is the provision of a rake which is adapted to operate by simply pushing it towards the operator, without going to the trouble of lifting the rake at each stroke.

Another object of the invention is to provide a rake having a tooth bar which is mounted to turn when the rake is pushed from the operator, thereby causing the teeth to lie flat upon the ground, so as to remove trash or other accumulation therefrom in a continued backward movement of the rake, the teeth automatically assuming a vertical position upon drawing the rake forward without any other manipulation upon the part of the operator.

Other objects of the invention will appear as the disclosure progresses. The drawing is intended to merely indicate a possible embodiment of the invention. It is obvious that the actual needs of manufacture may necessitate certain mechanical changes. It is therefore not intended to limit the invention to the embodiment illustrated but rather to define such limits in the appended claims.

For a more general understanding of the invention attention is called to the drawing. In this drawing like reference characters denote like parts throughout the specification.

Figure 1 is a top plan view of the rake.

Figure 2 is a side view thereof.

Figure 3 is a section on line 3—3 of Figure 1.

Figure 4 is an enlarged section on line 4—4 of Figure 2.

Figure 5 is a similar view as Figure 4 but showing the teeth latched on a horizontal plane.

Figure 6 is a section on line 6—6 of Figure 4.

Figure 7 is a view of the sleeve.

Figure 8 is a cross sectional view of one of the caps.

Referring now to the drawing in detail, numeral 1 designates the usual handle and 2 the Y-shaped support connected at the outward ends to the bearings 3. Revolvably supported in said bearings are sleeves 4. At the outward ends of said sleeves are attached caps 5 while at the inner ends of said sleeves is keyed the tooth bar 6. Fastened to the said tooth bar are a series of rake teeth 7.

Within each of the sleeves 4 is a leaf spring 8 whose free end 9 enters a slot 10 in the sleeve and normally keeps the sleeve in the position as best seen in Figure 4 or when the teeth are at right angles to the handle.

As the tooth bar 6 is keyed to the sleeves 4 therefore the said sleeves and tooth bar will move in unison. When cleaning the teeth, on the forward stroke of the rake, the teeth when brought in contact with the ground will swing inwardly against the normal action of the spring in the direction of arrow A of Figure 4 and automatically relieve themselves of all foreign matter which may adhere to the teeth, by the scraping action with the ground. Now when the rake is pulled towards the operator the teeth will spring back to their vertically operative position.

Now when it is desired to work the rake without allowing the teeth to swing inwardly a hook 11 which is pivoted to each of the sleeves is moved down so that the forward end 12 engages with the top portion 13 of the set of outside teeth thus holding the tooth bar against revolving and consequently keep the teeth in a rigid vertical position. In Figure 2 the hook 11 in full lines, shows the teeth 7 locked in a vertical position against any inward movement. Now when it is desired to allow the teeth to swing inwardly as shown in dotted lines the hook 11 is swung backward on the sleeve as indicated in dotted lines in the said figure so the teeth will be free to move.

When the rake is not in use the teeth can be swung out of the way and kept in that position parallel with the handle so as to avoid accidental injury to anyone who might step on the teeth should same be exposed. This safety feature is illustrated in Figure 5. As noted in this figure when the teeth are swung all the way back, the edge of the slot 10 in the sleeve 4 will engage with the free end 9 of the spring 8 and lock the said sleeve against rotation until manually relieved. As all the teeth move in unison with the sleeve thus all the teeth will be kept out of the way.

It will thus be seen that I have provided a simple, efficient and very useful device for raking loose leaves, grass or other matter. The rake is employed in the same manner as the ordinary hand rake, being moved toward and away from the operator, the tooth bar supported by its teeth always resting upon the ground during movement towards the operator to draw toward him the loose leaves, grass or other matter being raked up. Upon movement of the rake away from the operator, the tooth bar is customarily raised above the ground in order to avoid pushing any of the waste matter to be gathered in at the next movement of the rake, away from the operator. If however, the teeth become clogged with the waste matter being raked up, the tooth head may be held in engagement with the ground during the early part of the movement of the rake away from the operator. This engagement of the tooth head with the ground will cause the tooth head to turn against the action of the spring until stopped from further movement. In this position the tooth head will bear flatly upon the ground and all waste matter caught upon the teeth of the rake will be wiped off. As soon as the tooth head is again raised from the ground, the spring will immediately return it to its normal position.

Having described my invention, I claim:

1. In a rake of the class described, including a handle, a tooth supporting bar pivotally supported by the handle, means for locking the tooth bar with its teeth in a plane parallel to the handle, means operable upon release of the locking means for automatically turning the supporting bar to bring its teeth into a plane at right angles to the handle, and means including a latch to positively latch said teeth against movement from the last mentioned position.

2. In a rake of the class described, a pair of bearings, a handle, means to connect said handle to said bearings, sleeves revolvably supported in said bearings, a tooth bar keyed to the inner ends of said sleeves, said tooth bar supporting a series of teeth, and a spring in each of said bearings, the free ends of said springs passing into a slot in said sleeves and adapted to normally keep the said teeth at right angles to said handle.

3. In a rake of the class described, a pair of hollow bearings, a handle, means to connect said handle to said bearings, sleeves provided with slots revolvably supported in said bearings, a tooth bar keyed to the inner ends of said sleeves, said tooth bar supporting a series of teeth, and a leaf spring in each of said bearings, the free ends of said springs passing into the slots in said sleeves and adapted to normally keep the said teeth perpendicular to the ground.

4. In a rake of the class described, a pair of bearings, a handle, means to connect said handle to said bearings, sleeves revolvably supported in said bearings, a tooth bar keyed to the inner ends of said sleeves, said tooth bar supporting a series of teeth, a spring in each of said bearings, the free ends of said springs passing into a slot in said sleeves and adapted to normally keep the said teeth at right angles to said handle, and means to latch said teeth against movement from the last mentioned position.

5. In a rake of the class described, a pair of hollow bearings, a handle, means to connect said handle to said bearings, sleeves provided with slots revolubly supported in said bearings, a tooth bar keyed to the inner ends of said sleeves, said tooth bar supporting a series of teeth, a leaf spring in each of said bearings, the free ends of said springs passing into the slots in said sleeves and adapted to normally keep the said teeth perpendicular to the ground, and means to latch the said teeth in a position perpendicular to the ground.

6. In a rake of the class described, a pair of bearings, a handle, means to connect said handle to said bearings, sleeves revolvably supported in said bearings, a tooth bar keyed to the inner ends of said sleeves, said tooth bar supporting a series of teeth, a spring in each of said bearings, the free ends of said springs passing into a slot in said sleeves and adapted to normally keep the said teeth at right angles to said handle, and means including said springs to latch said teeth in a position parallel to said handle.

7. In a rake of the class described, a pair of bearings, a handle, means to connect said handle to said bearings, sleeves revolvably supported in said bearings, a tooth bar keyed to the inner ends of said sleeves, said tooth bar supporting a series of teeth, a spring in each of said bearings, the free ends of said springs passing into a slot in said sleeves and adapted to normally keep the said teeth at right angles to said handle, and means to latch said teeth against movement from the position of right angles to said handle, and means including said springs to latch said teeth in a position parallel to said handle.

8. In a rake of the class described, a pair of hollow bearings, a handle, means to connect said handle to said bearings, sleeves provided with slots revolvably supported in said bearings, a tooth bar keyed to the inner ends of said sleeves, said tooth bar supporting a series of teeth, a leaf spring in each of said bearings, the free ends of said springs passing into the slots in said sleeves and adapted to normally keep the said teeth perpendicular to the ground, and means to latch said teeth parallel to said handle.

9. In a rake of the class described, a pair of hollow bearings, a handle, means to connect said handle to said bearings, sleeves provided with slots revolvably supported in said bearings, a tooth bar keyed to the inner ends of said sleeves, said tooth bar supporting a series of teeth, a leaf spring in each of said bearings, the free ends of said springs passing into the slots in said sleeves and adapted to normally keep the said teeth perpendicular to the ground, and means to latch the said teeth in a position perpendicular to the ground, and means including said leaf spring to latch said teeth parallel to said handle.

10. In a device of the class described, a set of bearings, a sleeve revolvably fixed in said bearings, a tooth bar keyed to said bearings, a set of teeth in said tooth bar, a latch pivoted to each of said bearings, said latch adapted to engage with the upper part of said teeth to hold said teeth in a vertical position.

In testimony whereof I affix my signature.

JOHN VAN VLIET.